US012568534B2

(12) United States Patent
Osauskas et al.

(10) Patent No.: US 12,568,534 B2
(45) Date of Patent: Mar. 3, 2026

(54) OBJECT TRACKING SYSTEM AND METHOD

(71) Applicant: UAB TELTONIKA IOT GROUP, Vilnius (LT)

(72) Inventors: Martynas Osauskas, Vilnius (LT); Mindaugas Macijauskas, Vilnius (LT)

(73) Assignee: UAB "TELTONIKA IOT GROUP", Vilnius (LT)

( * ) Notice: Subject to any disclaimer, the term of this patent is extended or adjusted under 35 U.S.C. 154(b) by 392 days.

(21) Appl. No.: 18/270,086

(22) PCT Filed: Aug. 24, 2021

(86) PCT No.: PCT/IB2021/057749
§ 371 (c)(1),
(2) Date: Jun. 28, 2023

(87) PCT Pub. No.: WO2022/144612
PCT Pub. Date: Jul. 7, 2022

(65) Prior Publication Data
US 2024/0080912 A1     Mar. 7, 2024

(30) Foreign Application Priority Data
Dec. 29, 2020     (LT) ..................................... 2020 565

(51) Int. Cl.
*H04W 4/029*     (2018.01)
*H04W 76/10*     (2018.01)
*H04W 84/18*     (2009.01)

(52) U.S. Cl.
CPC ............ *H04W 76/10* (2018.02); *H04W 84/18* (2013.01)

(58) Field of Classification Search
CPC ..... H04W 76/10; H04W 84/18; H04W 4/029; H04W 4/80
See application file for complete search history.

(56) References Cited

U.S. PATENT DOCUMENTS 9,338,638 B1 *     5/2016   Palin ..................... H04W 12/37
10,080,100 B2       9/2018   Li et al.
(Continued)

FOREIGN PATENT DOCUMENTS

EP           3222114 A1     9/2017

*Primary Examiner* — Cindy Trandai
(74) *Attorney, Agent, or Firm* — NIXON & VANDERHYE

(57)     ABSTRACT

Method and system for object tracking comprises transmission of tracking signal of primary and auxiliary tracking devices and exchange of information between the primary and the auxiliary tracking devices via low-energy Bluetooth connectivity (BLE), in the 2.4 GHz frequency band. Auxiliary tracking device connects automatically to primary tracking device upon activation of auxiliary tracking device. After successful pairing with primary tracking device auxiliary tracking device activates GATT service with the following characteristics: status of the internal power supply, product uptime, counter of received periodic BLE packets, counter of undetected periodic BLE packets, counter of the number of alarms, GSM module uptime. After pairing auxiliary tracking device communicates with primary tracking device by sending periodic BLE information packets and waits for feedback, and if, during the feedback search, auxiliary tracking device does not detect a BLE packet transmitted by primary tracking device, the auxiliary tracking device switches to the alarm mode.

12 Claims, 4 Drawing Sheets

(56)         References Cited

U.S. PATENT DOCUMENTS

| | | | |
|---|---|---|---|
| 10,229,573 B1 * | 3/2019 | Lawrie | G08B 21/0247 |
| 10,447,784 B2 * | 10/2019 | Britt | H04W 4/21 |
| 2009/0020705 A1 | 1/2009 | Pandelisev | |
| 2011/0021147 A1 * | 1/2011 | Tout | H04M 1/72412 |
| | | | 455/41.2 |
| 2018/0017946 A1 * | 1/2018 | Kyou | G04R 20/26 |
| 2018/0228408 A1 * | 8/2018 | Raisoni | A61B 5/14532 |
| 2018/0336382 A1 | 11/2018 | Sacks et al. | |
| 2018/0349242 A1 * | 12/2018 | Mathews | H04W 12/37 |
| 2019/0197814 A1 * | 6/2019 | Senguttuvan | G06Q 20/204 |
| 2020/0236494 A1 * | 7/2020 | Ronan | H04L 12/403 |
| 2020/0320843 A1 * | 10/2020 | Carr | A61B 5/1117 |
| 2021/0097841 A1 * | 4/2021 | Quibelan | H04W 52/52 |
| 2021/0152976 A1 * | 5/2021 | Daoura | H04W 52/0254 |
| 2021/0165979 A1 * | 6/2021 | Wilkinson | G06Q 10/08 |
| 2021/0409923 A1 * | 12/2021 | Kumar | H04L 12/4633 |
| 2022/0109909 A1 * | 4/2022 | Karuppiah | H04L 67/34 |
| 2022/0151007 A1 * | 5/2022 | Lee | H04W 8/005 |
| 2022/0201452 A1 * | 6/2022 | Lee | H04B 5/77 |
| 2024/0030753 A1 * | 1/2024 | Kim | H02J 50/80 |

* cited by examiner

OBJECT TRACKING SYSTEM AND METHOD

CROSS REFERENCES

This application is a U.S. national stage application of international patent application number PCT/IB2021/057749 filed on Aug. 24, 2021, claiming priority to Lithuanian national application number LT2020565 filed on Dec. 29, 2020.

TECHNICAL FIELD

The invention relates to systems and methods for asset detection and tracking, and more particularly to a system and a method based on several synchronized, periodically communicating asset detection and tracking devices, at least one of which is operating at low energy consumption.

BACKGROUND OF THE INVENTION

Asset detection and tracking systems have evolved and grown rapidly during the last two decades. The most used technology remains GNSS (Global Navigation Satellite System) tracking, which is one of the most reliable currently available on the market. However, it must be taken into account that GNSS tracking is used to detect and track objects in an open area (i.e. outdoors). GNSS connection is not sufficient to detect and track objects in confined spaces. Following technologies are also used: RFID (Radio-frequency identification), Wi-Fi (Wireless Fidelity), NFC (Near-Field-Communication), UHF (Ultra high frequency), VHF (Very high 0.5 frequency), BLE (Bluetooth Low Energy) and UWB (Ultra-Wide Band). These technologies are mainly used for indoor tracking, but remain less popular than GNSS connectivity due to their significantly higher price and lower reliability. For instance BLE technology is not directly related to GNSS coordinates, but it is possible to retrieve such coordinates using a server side mapping. Another downside of these systems is that they require an infrastructure that might not be available in some countries.

The closest prior art has been disclosed in the U.S. patent application Ser. No. 12/378,242 (number of publication US2009/0207050A1). The application discloses a system and a method for asset tracking and detection using a network of very high frequency (VHF) towers and a control centre that receives and transmits the signals. Every primary detection means is equipped with a transmitter, a receiver, and a transponder, which is activated when a signal is sent to the receiver from the control centre via VHF towers. Auxiliary detection devices include at least a transmitter the signal sent by which is received by at least one receiver of the primary detection means that transmits the signal to the control centre via VHF towers. The primary detection means and auxiliary detection means can be installed in one object. According to one of the examples of invention embodiment. the detection device shall send the signals to the primary detection means and if the primary means is not detected the auxiliary detection device, using its own transmitter, shall send the signal to the control centre via VHF towers. Several auxiliary detection means could be used, communicating with the primary detection means at different frequencies. To save energy, auxiliary detection devices send a low-energy, short signals to the primary detection means. Upon reception of such a signal the primary means shall send the response. In case the auxiliary detection device receives no signal confirmation from the primary detection means, the device shall switch to higher energy consumption operation mode and send a stronger signal, starting to operate as a primary detection means. The main drawback of this system is that it requires a certain infrastructure to be able to use this connectivity, and in most countries, it is not well-developed. To use the asset tracking and detection system via VHF towers it is necessary to examine the area to determine whether there are enough VHF towers for the system to operate properly. Another disadvantage of this system is that installations operating via VHF towers are constantly transmitting information and can be easily detected and dismantled with special equipment, increasing the probability of the theft of the assets being tracked.

The invention does not have the above-mentioned drawbacks related to the information transmission technology and increased probability of the theft and includes additional advantages.

SUMMARY OF THE INVENTION

The invention is an object tracking method and a system for implementation of such method. The method comprises transmission of a tracking signal of a primary tracking device (1) and exchange of information between the primary tracking device (1) and an auxiliary tracking device (2) via low-energy BLE connectivity, in the 2.4 GHz frequency band. The auxiliary tracking device (2) transmits information to the primary tracking device (1) only in case of pairing to the primary tracking device (1) and in response to the primary device (1). The pairing procedure is initiated by the primary tracking device (1). The auxiliary tracking device (2) connects automatically to the primary tracking device (1) upon activation of the auxiliary tracking device (2). After successful pairing with the primary tracking device (1), the auxiliary tracking device (2) activates the GATT service with the following characteristics: status of the internal power supply, product uptime, counter of received periodic BLE packets, counter of undetected periodic BLE packets, counter of the number of alarms, GSM module uptime. After pairing, the auxiliary tracking device (2) communicates with the primary tracking device (1) by sending periodic BLE information packets and waits for feedback. If during the feedback search the auxiliary tracking device (2) does not detect a BLE packet transmitted by the primary tracking device (1), the auxiliary tracking device (2) switches to alarm mode (24).

BRIEF DESCRIPTION OF THE DRAWINGS

Features of the invention believed to be novel and inventive are set forth with particularity in the appended claims. The invention itself, however, may be best understood by reference to the following detailed description of the invention, which describes exemplary embodiments, given in non-restrictive examples, of the invention, taken in conjunction with the accompanying drawings, in which:

Preferred embodiments of the invention will be described herein below with reference to the drawings. Each figure contains the same numbering for the same or equivalent element.

DETAILED DESCRIPTION OF THE INVENTION

It should be understood that numerous specific details are presented in order to provide a complete and comprehensible description of the invention embodiment. However, the person skilled in art will understand that the embodiment examples do not limit the application of the invention which can be implemented without these specific instructions. Well-known methods, procedures and components have not been described in detail for the embodiment to avoid misleading. Furthermore, this description should not be considered to be constraining the invention to given embodiment examples but only as one of possible implementations of the invention.

Figure 1:
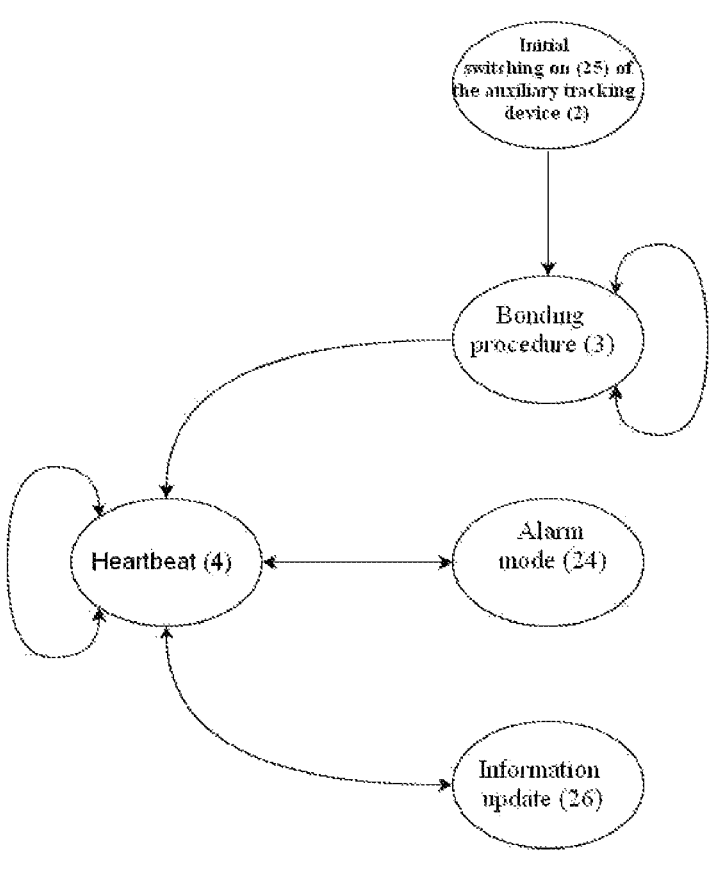
FIG. 1 shows diagram of the system states from perspective of the auxiliary tracking device (2).
Figure 2:
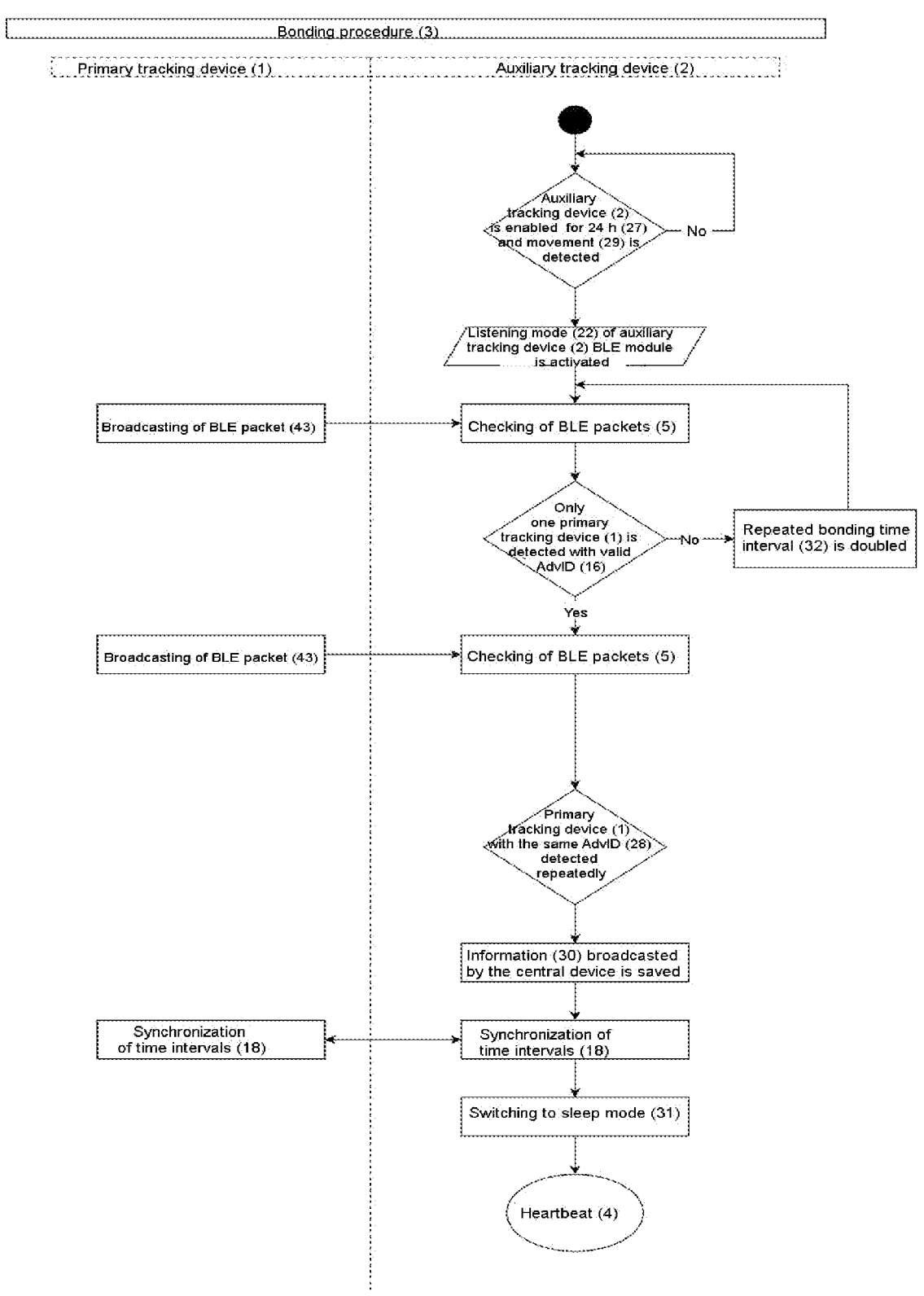
FIG. 2 shows block diagram of pairing procedure between the central tracking device and the auxiliary tracking device (2): upon first switching on the auxiliary tracking device (2), it starts the pairing procedure with the central tracking device after 24 hours.
Figure 3:
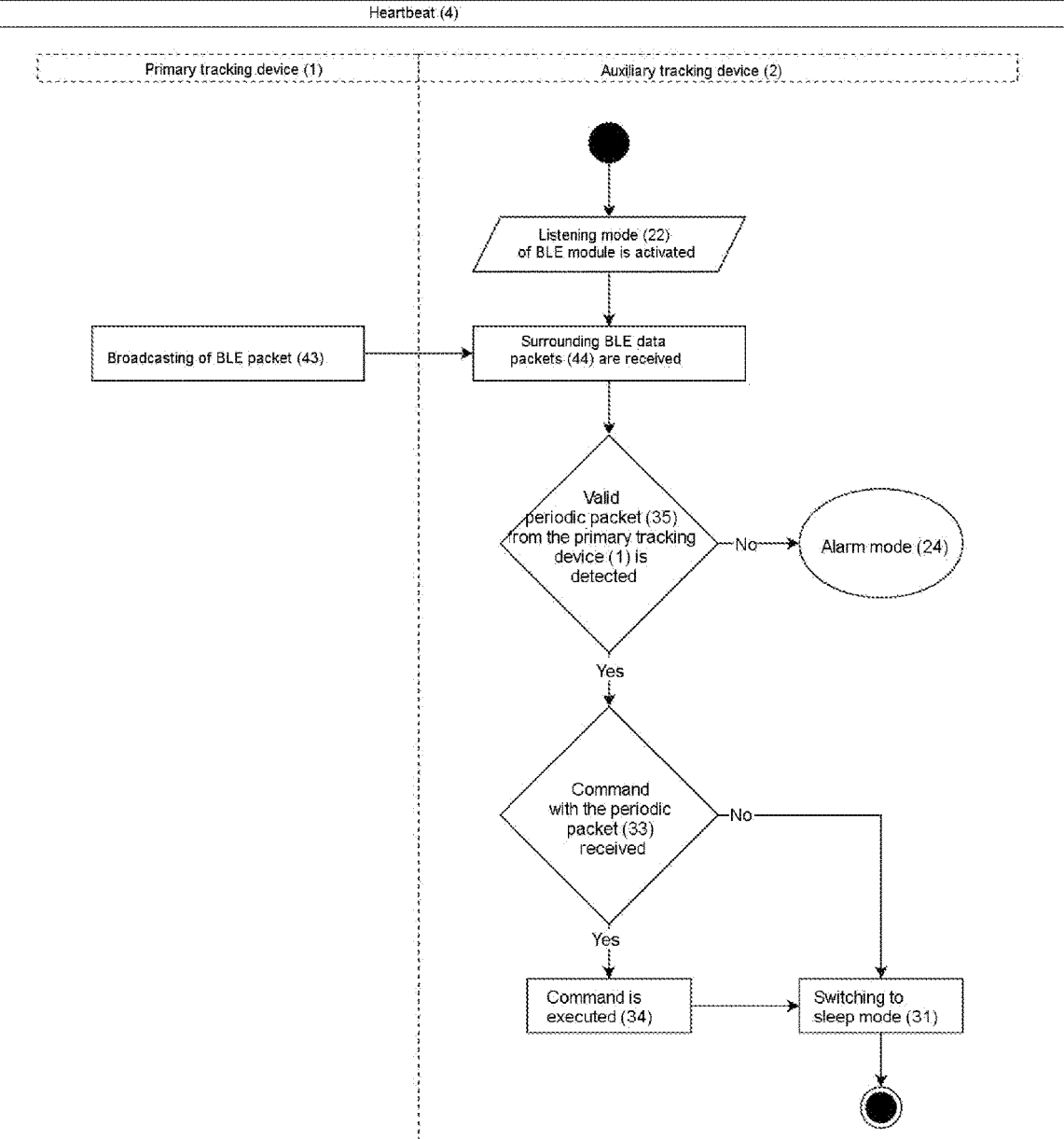
FIG. 3 shows block diagram of the system operation when the auxiliary tracking device (2) checks presence of the central device.
Figure 4:
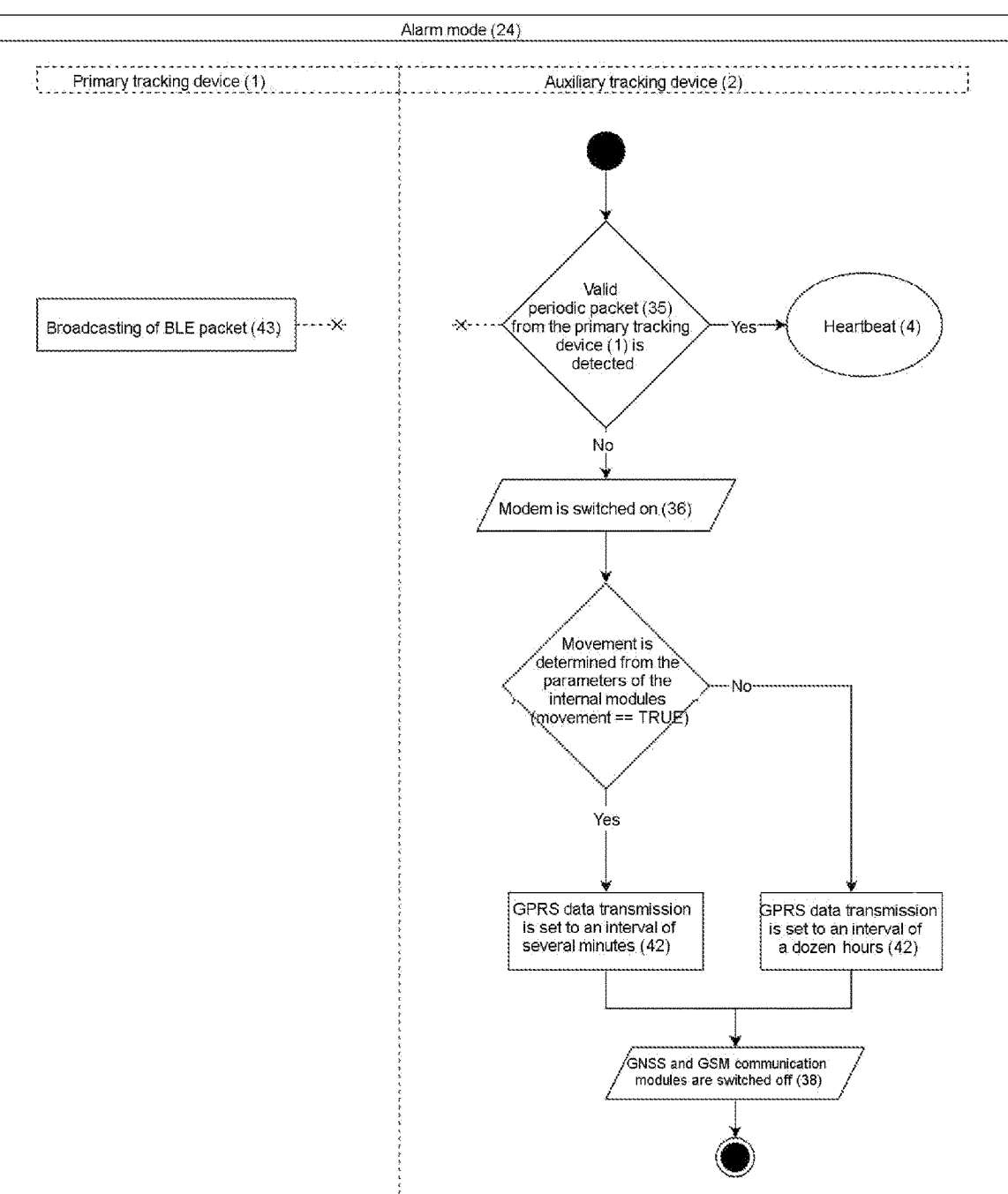
FIG. 4 shows block diagram of the system operation when the auxiliary tracking device (2) is in the alarm state.

According to first embodiment of the invention, the object tracking system comprises a primary tracking device (1) and an auxiliary tracking device (2). The auxiliary tracking device (2) and the primary tracking device (1) communicate with each other using BLE technology. The auxiliary tracking device (2) transmits BLE information to the primary tracking device (1) only in case of a pairing to the primary tracking device (1) and in response to the primary tracking device (1). The auxiliary tracking device (2) connects automatically to the primary tracking device (1) upon activation (25) of the auxiliary tracking device (2). The pairing procedure is initiated by the primary tracking device (1). The primary tracking device (1) and the auxiliary tracking device (2) communicate with each other and are only visible to each other in the 2.4 GHz frequency band. The pairing procedure, standard operating mode, and alarm mode of the auxiliary tracking device (2) are shown in the status diagram in FIG. 1. This makes the auxiliary tracking device (2) technologically difficult to detect in a radio frequency environment. After the first activation (25) of the auxiliary tracking device (2), the pairing procedure to the primary tracking device (1) is started after 24 hours. This ensures that the physical process of installing the auxiliary tracking device (2) does not interfere with the pairing procedure. The pairing procedure will start only if the following conditions are met: the auxiliary tracking device (2) has already been operational for 24 hours (27) and the movement of the auxiliary tracking device (2) has been detected (29) according to the parameters of internal modules.

After the pairing procedure (3) has started, listening mode (22) of the BLE module of the tracking device (2) is activated. The auxiliary tracking device (2) receives (4) the surrounding BLE data packets (44), checks (5) IDs (identifiers) recorded in the packets until a valid ID is detected (6) by the primary tracking device (1). The primary tracking device (1) transmits (7) valid and false IDs in the information bit fields (8) in the frame of the BLE packet the purpose of which is to transmit (9) correct ID to the auxiliary tracking device (2) and at the same time to impede the dissemination of the data to a third party.

BLE data packets (44) received (4) by the auxiliary tracking device (2) are decompressed (11) using specific internal algorithms. The auxiliary tracking device (2) checks (12) the validity of all IDs broadcasted by the primary tracking device (1). If a valid ID is not detected within a short period of time, the auxiliary tracking device (2) stops (13) the pairing procedure for several minutes, ignoring (14) all BLE packets. After a dozen minutes the procedure is repeated (15). If a valid ID is detected (16), the auxiliary tracking device (2) checks (17) the validity of the ID again (28) after a dozen minutes. When the same ID is received both times, the auxiliary tracking device (2) will determine its own periphery ID (30), which was received from the primary tracking device (1), and enters the BLE data broadcast mode (17) and synchronises (18) the time intervals for the periodic BLE data transmissions. After successful pairing, the auxiliary tracking device (2) switches to sleep mode (31).

If another valid ID is received during re-check (19), the auxiliary tracking device (2) erases (20) from memory all the valid IDs received and repeat the whole procedure from the beginning. The time intervals for each failed pairing repeat are doubled (32) every sixth test series until an interval of 64 hours is reached.

In the operating mode of the auxiliary tracking device (2), the GSM/GPRS (2.1) modules are not activated (21) to make it difficult to detect them in the vehicle, while the BLE module operates in the listening mode (22), without broadcasting any information itself.

To inform the auxiliary tracking device (2) that the primary tracking device (1) is still active, the primary tracking device (1) shall periodically broadcast (23) a BLE information packet (43) to the auxiliary tracking device (2) at intervals of several hundred seconds. Auxiliary tracking device (2) checks the validity (35) of each BLE packet detected. The BLE information frame broadcasted by the primary tracking device (1) shall contain the unique identifier of the primary tracking device (1), the identifier of the auxiliary tracking device (only if the pairing procedure has already taken place), and an operational bit indicating to the auxiliary tracking device (2) that an exchange of data between the primary tracking device (1) and the auxiliary tracking device (2) is requested.

If the periodic BLE information packet is not received, the auxiliary tracking device (2) extends the data search interval by a dozen minutes, waiting for information from the primary tracking device (1). If a valid ID is received during an extended search, the auxiliary tracking device (2) resynchronises the time intervals (18) and continues to operate in standard mode. If no BLE packet (43) broadcasted by the primary tracking device (1) is detected during the extended data search, the auxiliary tracking device (2) enters alarm mode (24).

As the BLE module of the auxiliary tracking device (2) only receives BLE packets in its standard operating mode, in order to initiate a data exchange between the primary (1) and the auxiliary tracking device (2), the primary tracking device (1) shall trigger the connection request bit in the broadcasted BLE frame. The auxiliary tracking device (2) having connected to the primary tracking device (1) enables the characteristics of the auxiliary tracking device (2) to be read and recorded (26).

The auxiliary tracking device (2) may receive specific purpose commands (33) which, when executed (34), cause it to enter sleep mode (31). Specific purpose commands (33):

Pause the monitoring of the primary tracking device (1) for x time. The time interval of the pause time is transmitted by the primary tracking device (1) together with the command itself. During paused monitoring, the auxiliary device (2) continues checking the presence of the primary device (1), simply ignoring the fact if not detected. At the end of the time interval, the auxiliary tracking device (2) returns to the standard operating mode.

Activate detection of the primary tracking device (1). This command is only used if the tracking activity of the primary device (1) has already been paused before.

The GATT service is implemented in the auxiliary tracking device (2). After successful pairing with the primary tracking device (1) the auxiliary tracking device (2) triggers the GATT service with the following characteristics: status of the internal power supply, product uptime, counter of received periodic BLE packets, counter of undetected periodic BLE packets, counter of the number of alarms, GSM module uptime.

If the auxiliary tracking device (2) does not detect the primary tracking device (1), the auxiliary tracking device (2) additionally waits for an information message for a dozen seconds. If no BLE packet (43) broadcasted by the primary tracking device (1) is detected during the extended data search, the auxiliary tracking device (2) enters alarm mode (24).

If movement is detected from the parameters of the internal modules (39) (ref.: movement flag=TRUE) in alarm mode (24), GPRS data shall be transmitted at intervals of a few minutes (41), if no movement is detected from the parameters of the internal modules (ref.: movement flag=FALSE), GPRS data shall be transmitted at intervals of a dozen hours (42). Data is transmitted (40) using GPRS technology, therefore, having entered the alarm mode (24), a modem (36) is activated. The transmitted packet comprises the following data: the timestamp of the generated record (37), GNSS data such as longitude, latitude, altitude, the number of satellites used, the voltage of the internal cell and other configurable parameters shall be enabled as required. The GPRS data shall be transmitted (40) at intervals of a dozen minutes or hours (depending on whether motion is detected) between which the product shall disable (38) the GNSS and GSM modules in order to conserve the internal element and to minimise the visibility of the product in the RF environment in case the GPRS transmission is not timed. Only BLE communication module is switched on for the detection of the primary tracking device. Although numerous characteristics and advantages together with structural details and features have been listed in the present description of the invention, the description is provided as an example fulfilment of the invention. Without departing from the principles of the invention, there may be changes in the details, especially in the form, size and layout, in accordance with most widely understood meanings of the concepts and definitions used in claims.

The invention claimed is:

1. A method for tracking an object, the method comprising:

transmitting tracking signals of a primary tracking device and an auxiliary tracking device, and exchanging information between the primary tracking device and the auxiliary tracking device, wherein the auxiliary tracking device and the primary tracking device communicate with each other via low-energy Bluetooth connectivity (BLE) and are visible to each other only in the 2.4 GHz frequency band, and the auxiliary tracking device broadcasts information to the primary tracking device only in case of a pairing to the primary tracking device and in response to the primary tracking device, and a pairing procedure is initiated by the primary tracking device;

the auxiliary tracking device connects automatically to the primary tracking device upon activation of the auxiliary tracking device, wherein after successful pairing with the primary tracking device, the auxiliary tracking device activates the GATT service with the following characteristics: status of the internal power supply, product uptime, counter of received periodic BLE packets, counter of undetected periodic BLE packets, counter of the number of alarms, GSM module uptime, wherein, after pairing the auxiliary tracking device communicates with the primary tracking device by sending periodic BLE information packets and waits for feedback wherein, if no BLE packet broadcasted by the primary tracking device is detected during the feedback search, the auxiliary tracking device enters alarm mode.

2. The method according to claim 1, wherein after the first activation of the auxiliary tracking device, pairing of the auxiliary tracking device to the primary tracking device is started after 24 hours.

3. The method according to claim 2, wherein the pairing procedure starts if the auxiliary tracking device has already been operational for 24 hours and the movement of the auxiliary tracking device has been detected according to the parameters of internal modules.

4. The method according to claim 1, wherein the pairing procedure having started, the auxiliary tracking device receives the surrounding BLE data packets, checks the IDs recorded in the packets until a valid ID is detected by the primary tracking device, the primary tracking device transmits valid and false IDs in the information bit fields in the frame of the BLE packet.

5. The method according to claim 1, wherein the data packets received by the auxiliary tracking device are decompressed using specific internal algorithms, the auxiliary tracking device checks the validity of all the IDs broadcasted by the primary tracking device, and if a valid ID is not detected in a short time period the auxiliary tracking device (2) stops the pairing procedure for a dozen minutes, ignoring all BLE packets, wherein the pairing procedure is repeated after a dozen minutes and, if a valid ID is detected, the auxiliary tracking device checks the validity of the ID again after a dozen minutes wherein, if the same ID is received on both occasions, the auxiliary tracking device determines its own peripheral ID which was received from the primary tracking device and enters BLE data broadcasting mode, and synchronises the time intervals for the periodical transmission of BLE data.

6. The method according to claim 5, wherein upon receipt of another valid ID during the repeated check, the auxiliary tracking device erases from memory all received valid IDs and repeats the entire procedure from the beginning with the time intervals for each failed pairing repeat doubled every sixth test series until an interval of 64 hours is reached.

7. The method according to claim 1, wherein for the purpose of informing the auxiliary tracking device that the primary tracking device is still active, the primary tracking device periodically broadcasts informational BLE packet to the auxiliary tracking device at the intervals of several hundred seconds and the BLE information frame broadcasted by the primary tracking device indicates the unique identifier of the primary tracking device, the identifier of the auxiliary tracking device in the case of the pairing procedure has already taken place, and an operational bit indicating to the auxiliary tracking device that an exchange of data between the primary tracking device and the auxiliary tracking device is requested.

8. The method according to claim 1, wherein, if the periodic BLE information packet is not received, the auxiliary tracking device extends the data search interval by a dozen minutes, waiting for information from the primary tracking device, and upon receipt of the valid ID during the extended data search the auxiliary tracking device synchronizes time intervals and continues operation in the standard mode, if the BLE packet broadcasted by the primary tracking device is not received during the extended data search, the auxiliary tracking device switches to alarm mode.

9. The method according to claim 1, wherein the primary tracking device triggers the connection request bit in the broadcasted BLE frame and the auxiliary tracking device when connected to the primary tracking device enables the characteristics of the auxiliary tracking device to be read and recorded.

10. The method according to claim 1, wherein the auxiliary tracking device comprises the following commands:

pause the monitoring of the primary tracking device for x time wherein the paused time interval is transmitted by the primary tracking device together with the command itself and, during paused monitoring, the auxiliary device continues checking the presence of the primary device, simply ignoring the fact if not detected, and activate detection of the primary tracking device.

11. The method according to claim 1, wherein in the alarm mode the data is only transmitted if parameters of the internal modules detect movement, the data is transmitted using GPRS technology, the transmitted packet comprises the following data: time of generated record, GNSS data such as longitude, latitude, altitude, the number of satellites used, the voltage of the internal cell, GPRS data is transmitted in the intervals of a dozen minutes, in-between the intervals the product switches off all communication modules.

12. The method according to claim 11, wherein the auxiliary tracking device being in the alarm mode detects that there is no movement according to the parameters of internal modules and does not transmit GPRS data and switches off GNSS and GSM modules, only BLE communication module is switched on for the detection of the primary tracking device.

* * * * *